United States Patent

[11] 3,624,056

| [72] | Inventor | Robert J. Minchak<br>Parma Heights, Ohio |
|---|---|---|
| [21] | Appl. No. | 491,038 |
| [22] | Filed | Sept. 28, 1965 |
| [45] | Patented | Nov. 30, 1971 |
| [73] | Assignee | The B. F. Goodrich Company<br>New York, N.Y. |

[54] OLEFIN INTERPOLYMERS PREPARED WITH A CATALYST SYSTEM OF A TITANIUM COMPOUND, ALKYL ARYL HALIDE AND DIARYL MAGNESIUM
11 Claims, No Drawings

[52] U.S. Cl. .................................................. 260/80.6,
252/429 C, 260/80.7, 260/80.78, 260/82.1,
260/85.3, 260/88.2 E, 260/79.5 B

[51] Int. Cl. .................................................. C08f 15/40
[50] Field of Search .......................................... 260/94.9 B,
80.78, 88.2, DIG. 26, 94.9 E, 85.3

[56] References Cited
UNITED STATES PATENTS
3,392,159  7/1968  Schooley ......................  260/93.7

*Primary Examiner*—Joseph L. Schofer
*Assistant Examiner*—A. Holler
*Attorneys*—J. Hughes Powell, Jr. and Ernest K. Bean

ABSTRACT: Conjugated and nonconjugated polyunsaturated hydrocarbon monomers are interpolymerized with $\alpha$-olefins with a catalyst comprising a reducible compound of titanium, an alkyl aluminum halide and a diaryl magnesium compound.

OLEFIN INTERPOLYMERS PREPARED WITH A CATALYST SYSTEM OF A TITANIUM COMPOUND, ALKYL ARYL HALIDE AND DIARYL MAGNESIUM

This invention relates to olefin polymers and relates more particularly to a catalyst and improved process for preparing homogeneous, unsaturated sulfur-vulcanizable interpolymers of alpha-olefins.

Unsaturated polymers of ethylene and propylene which are sulfur-vulcanizable have many uses in industry. Improved processes for preparing such materials, particularly sulfur-vulcanizable elastomers, are desired. I have now found a novel method for preparing homogeneous copolymers and terpolymers of certain alpha-olefins including ethylene and propylene with hydrocarbon monomers containing two or more olefinic double bonds by means of a novel catalyst system comprising a reducible titanium compound, a diaryl magnesium, and an alkyl aluminum halide.

By the method of this invention, conjugated and nonconjugated polyunsaturated aliphatic and alicyclic monomers may be interpolymerized with alpha olefins such as ethylene or butene-1 and/or propylene to provide sulfur-vulcanizable elastomers which have many commercial uses. This method is unique in that homogeneous interpolymers of ethylene and propylene with conjugated dienes are readily prepared. In the past, such polymers generally have not been satisfactory because conjugated dienes interfered with catalyst activity, homogeneous polymers were not easily obtained, the dienes were used up, either in the polymer chain; in forming homopolymer, or through cross-linking, which introduces undesirable gel into the elastomers, and the resulting products were not readily cured with sulfur and did not have the required balance of desired physical properties in the raw polymer or vulcanizates thereof.

In accordance with this invention one or more alpha-olefins containing two to six carbon atoms are readily polymerized to homogeneous interpolymers with aliphatic and alicyclic polyenes containing four to 10 carbon atoms and at least two

groups. The interpolymers will contain a major proportion of alpha-olefins and lesser proportions of polyene. For elastomers ethylene will be present in amounts from about 50 to 80 mol percent.

Homogeneous sulfur-vulcanizable polymers of ethylene and propylene have been prepared with butadiene, isoprene, piperylene, 2-ethyl-1,3-butadiene and myrcene which are typical of conjugated dienes polymerizable in accordance with this invention. Allene, 1,4,9-decatrienes, 1,5-cyclooctadiene, dicyclopentadiene, 4-methyl-1,4-hexadiene, norbornenes, norbornadiene, and the like are typical nonconjugated and polyunsaturated compounds which also are readily interpolymerized with the alpha-olefins. Copolymers are made, for example, from ethylene and butadiene and ethylene and allene. The polyene normally will be present in the polymer in amounts from about 0.1 to 20 mol percent, usually 0.5 to 5 percent. Elastomeric interpolymers will have an iodine number from about 2 to 45.

The catalyst of the invention requires an alkyl aluminum halide, a diaryl magnesium and a reducible titanium compound. The alkyl aluminum halides useful in this invention have the general formula $R_yAlX_{3-y}$. R is an alkyl group containing one to eight carbon atoms and more preferably two to four carbon atoms. Methyl, ethyl, propyl, and isobutyl derivatives have been used and are satisfactory. X is halogen including iodine, bromine, and chlorine, and $y$ is 1 or 2. Better results have been obtained when X is chlorine. In the alkyl aluminum compound the molar ratio or R to Al has been varied from 2.8 to 1 and these ratios are obtained by use of such compounds per se, as well as from mixtures of $R_3Al$, $R_2AlCl$ and $RAlCl_2$. It has also been found that small amounts of $R_3Al$, as triisobutyl aluminum, can be used in conjunction with an alkyl aluminum halide to increase the yield or catalyst activity and allow the diaryl magnesium concentration to be reduced. Particularly useful have been the dialkyl aluminum chlorides such as diethyl aluminum chloride, dipropyl aluminum chloride, and diisobutyl aluminum chloride. The preferred reducible compound of titanium is $TiCl_4$. The preferred diaryl magnesium is diphenyl magnesium.

The amounts of catalyst components have been varied as follows. The concentration of alkyl aluminum halide in millimols per liter of solvent used in the reaction has been varied from 1 to 12 and preferably is from 1.5 to 6. The diphenyl magnesium has been used at a concentration of 0.05 to 3 millimols per liter with 0.1 to 1 preferred. The titanium tetrachloride has been varied from 0.0025 to 1 millimol per liter and preferably is from about 0.01 to 0.5. Larger amounts of catalyst may be used but usually are not necessary. Normally, about 0.2 to 10 millimols of catalyst per liter of solvent will provide 100 grams of polymer. The concentration may be as high as 50 or more.

The Cl to Mg ratios usually are kept at about 3 to 30 and Al to Mg 2 to 60, and Mg to Ti of 2 to 100. On a molar basis the ratio of catalyst constituents may range from 2 to 1,000 Mg to 1 of Ti and 2 to 1,000 aluminum to 1 Mg. When solvents are not used the amounts of catalyst components are based on monomers charged.

The polymerization reactions may be conducted in batch or continuous process and equipment. The catalyst components are prepared separately and charged separately to a reactor. While the catalyst components can be premixed just prior to adding to the reactor it has been observed that better results are obtained when the components are charged separately to the reactor. It has been found that when the catalyst components are premixed and aged prior to use, even in dilute solution, that lower yields of desired polymer are obtained, for example, when the titanium and magnesium components are mixed and aged.

As is known, the equipment, solvent and monomers polymerized in accordance with alkyl metal reduced titanium catalyst must be essentially free of oxygen, water and other polar compounds. When solvents are used in the polymerization reaction they are normally treated to remove oxygen and water. Useful solvents include the aromatic hydrocarbons such as benzene, toluene preferably, and the like, chlorinated hydrocarbons and aliphatic hydrocarbons such as heptane and hexane. Usually employed are hydrocarbon solvents.

The temperature and pressure for the polymerization reactions may be varied quite widely. The catalyst and method of this invention are satisfactory at room temperature but the polymerization may be carried out at any temperature above the freezing point and below the boiling point of the solvent used. In the same manner while satisfactory polymerizations have been obtained at atmospheric pressure or at a pressure of only a few pounds, the polymerization may be carried out at high pressures.

In the examples I-IV set forth below to demonstrate the invention the following procedure was used. This catalyst has been used to polymerize with known catalysts. A glass-lined reactor was flushed with nitrogen and 200 ml. of dry benzene was added thereto. The nitrogen was then replaced with propylene and the polyunsaturated monomer added. The aluminum alkyl halide in benzene and diphenyl magnesium in chlorobenzene in the quantity shown in the tables were added to the reactor. The reactor, equipped with a shaker to provide agitation, was pressured with propylene to 5 to 7 p.s.i.g. and then to 10 p.s.i.g. with a monomer mixture containing 55 to 65 mol percent ethylene and 45 to 35 mol percent propylene. This provides about 5 to 10 weight percent of these monomers in the liquid phase in a ratio of about 5 mol percent ethylene and 95 mol percent propylene. Titanium tetrachloride in benzene was then charged to the reactor whereupon polymerization started immediately. The mixture of ethylene and propylene was fed into the reactor throughout the run to maintain the pressure at 10 p.s.i.g. The polymerization was allowed to proceed for periods of time up to 2 hours at which time the polymerizations were stopped by the addition of alcohol. The polymer was isolated from the reaction mixture either by evaporation of the solvent or by alcohol precipitation. The relative measure of the molecular weight was obtained by measuring dilute solution viscosity (DSV) at 25° C. of a solution containing 0.2 g. of polymer in 100 ml. to toluene. The ethylene concentration in polymer was determined by Infrared and the amount of the polyunsaturated monomer in the polymers determined by iodine number.

A measure of the vulcanization rate of the polymers was obtained by compounding samples in the following recipe.

| | |
|---|---|
| Polymers | 100 parts by weight |
| Zinc oxide | 50 parts by weight |
| Stearic acid | 10 parts by weight |
| Mercaptobenzothiazole | 5 parts by weight |
| Tetramethylthiuram monosulfide | 15 parts by weight |
| Sulfur | 15 parts by weight |

These cure rates were determined in accordance with the procedure outlined in U.S. Pat. No. 3,182,494 are identified in the tables on curometer ration. The lower the value, the better the cure.

EXAMPLE I

| Run | 1 | 2 | 3 |
|---|---|---|---|
| Butadiene (mM/l.)* | 110 | 110 | 165 |
| Ethyl$_2$AlCl (mM/l.) | 6 | 9 | 9 |
| Diphenyl Mg (mM/l.) | 2 | 2 | 3 |
| TiCl$_4$ (mM/l.) | 0.1 | 0.15 | 0.2 |
| Time (hr.) | 2 | 2 | 2 |
| Yield (g./l.) | 41 | 33 | 42 |
| DSV | 1.4 | 1.4 | 1.3 |
| % Insolubles | 0 | 3 | 3 |
| I$_2$Number | 6.1 | 7.8 | 13 |
| Mol % Propylene | 38 | 39 | 41 |
| Curometer ratio | 0.24 (5) | 0.19 (4) | 0.26 (4) |

*Millimols per liter of benzene

When this example is repeated with 0.1 mM/l. of VOCl$_3$ instead of TiCl$_4$ and in the absence of diphenyl magnesium, very little polymerization occurred because the butadiene poisons or complexes with the catalyst and the small amount of polymer obtained was nonhomogeneous and a mixture of low molecular weight polymer and trans-polybutadiene. When this example is repeated with triethyl aluminum in place of diethyl aluminum chloride, no polymer is obtained.

EXAMPLE II

| Run | 1 | 2 |
|---|---|---|
| Allene (mM/l.) | 120 | 60 |
| Ethyl$_2$AlCl (mM/l.) | 12 | 6 |
| Diphenyl Mg (mM/l.) | 4 | 2 |
| TiCl$_4$ (mM/l.) | 0.2 | 0.2 |
| Time (hr.) | 3 | 2 |
| Yield (g./l.) | 31 | 67 |
| DSV | 1.7 | 1.5 |
| % Insolubles | 19 | 0 |
| I$_2$ Number | 4.2 | 1.9 |
| Mol % Propylene | 34 | 44 |
| Curometer ratio | 0.11 (3) | 0.35 (4) |

This example was repeated with VOCl$_3$ instead of TiCl$_4$ and no diphenyl magnesium and the polymer, which was obtained in low yield, was not sulfur-vulcanizable.

EXAMPLE III

| | |
|---|---|
| 1,4,9-decatriene (mM/l) | 25 |
| Ethyl$_2$AlCl(mM/l) | 6 |
| Diphenyl Mg (mM/l) | 2 |
| TiCl$_4$ (mM/l) | 0.2 |
| Time (hr) | 1 |
| Yield (g./l.) | 49 |
| DSV | 1.5 |
| % Insolubles | 5 |
| I$_2$ Number | 3.5 |
| Mol % Propylene | 50 |
| Curometer ratio | 0.21 (4) |

This example was repeated but the TiCl$_4$ and diphenyl magnesium were premixed and aged for 24 hours before use. A low yield of a polymer having unsatisfactory physical properties was obtained.

EXAMPLE IV

| Run | 1 | 2 |
|---|---|---|
| Dicyclopentadiene | 20 | – |
| 1,5-cyclooctadiene | – | 400 |
| Ethyl$_2$AlCl (mM/l.) | 9 | 9 |
| Diphenyl Mg (mM/l) | 2 | 2 |
| TiCl$_4$ (mM/l) | 0.15 | 0.15 |
| Time (hr) | 1 | 2 |
| Yield (g/l) | 48 | 50 |
| DSV | 1.3 | 1.5 |
| % Insolubles | 14 | 7 |
| I$_2$ Number | 6.8 | 2.6 |
| Mol % Propylene | 41 | 43 |
| Curometer ratio | 0.24 (5) | 0.31 (5) |

EXAMPLE V

A series of runs were made in a high pressure continuous reactor with ethylene, propylene and butadiene-1,3, in benzene at 10° C. and pressures up to 80 p.s.i.g. Four hundred and eighty millimols of butadiene per liter of benzene used per hour was fed to the reactor. The ethylene/propylene ratio was about 40/40. The ratio of diethyl aluminum chloride, diphenyl magnesium and titanium tetrachloride was 3 to 1 to 0.2 and these amounts as millimols per liter of benzene were fed to the reactor. The residence time in the reactor was 1 hour. One of the resulting polymers had a dilute solution viscosity of 2 and an iodine number of 4.7, a raw Mooney value at 10 minutes of 78, and a curometer rating of 0.19 (5). When the polymer was compounded in the standard test recipe containing 60 parts of carbon black and 20 of oil the following physical properties were obtained; a 300 percent modulus of 800 p.s.i., a tensile strength at break of 2,100 percent p.s.i., an elongation of 620 percent and A Durometer value of 76. Another polymer of ethylene, propylene and butadiene made in the continuous reactor with a dilute solution viscosity of 2.03 and an iodine number of 7.6 was evaluated in the standard compounding recipe with 80 parts of carbon black and no oil and this polymer was found to have a 300 percent modulus of 1,900 p.s.i., tensile strength at break of 2,500 p.s.i. and an elongation of 400 percent. Polymers made with diisobutyl aluminum chloride also have excellent properties. In another continuous run using 1,4,9-decatriene instead of butadiene, an interpolymer which was sulfur-curable was obtained. In other runs ethylene, butene-1 and 1,4,9-decatrienes were readily polymerized to sulfur-vulcanizable interpolymers and butene-1 was polymerized with 1,4,9-decatriene.

I claim:

1. A method for copolymerizing alpha-olefins with conjugated and nonconjugated polyunsaturated aliphatic and alicyclic monomers, which comprises contacting an alpha olefin and an aliphatic or alicyclic monomer with a catalyst comprising an alkyl aluminum halide having the general formula $R_yAlX_{3-y}$ wherein R is an alkyl group containing two to eight carbon atoms and X is halogen, a diaryl magnesium and a titanium halide in a ratio on a molar basis from about 2 to 1,000 Mg to 1 Ti and 2 to 1,000 Al to 1 Mg.

2. A method of claim 1 for polymerizing alpha-olefins with aliphatic and alicyclic monomers which comprise contacting at least one alpha-olefin containing two to six carbon atoms and an aliphatic or alicyclic monomer containing four to 10 carbon atoms and at least two

groups with a catalyst comprising an alkyl aluminum chloride, a diaryl magnesium and a titanium tetrahalide.

3. A method of claim 2 for polymerizing ethylene and propylene with an aliphatic or alicyclic monomer containing four to 10 carbon atoms and at least two

groups and wherein y is 1 or 2.

4. A method of claim 1 for preparing unsaturated sulfur-vulcanizable polymers of alpha-olefin containing two to four carbon atoms with an aliphatic or alicyclic monomer containing four to 10 carbon atoms and at least two

groups with a catalyst comprising an alkyl aluminum chloride wherein the alkyl group contains two to four carbon atoms, diphenyl magnesium and titanium tetrachloride.

5. The method of claim 4 wherein ethylene and propylene are polymerized with an aliphatic or alicyclic monomer containing four to 10 carbon atoms and at least two

groups in the presence of a catalyst comprising diethyl aluminum chloride, diphenyl magnesium and titanium tetrachloride in a molar ratio of 1 to 12 diethyl aluminum chloride, 0.05 to 3 diphenyl magnesium and 0.01 to 0.5 titanium tetrachloride.

6. The method of claim 5 wherein the catalyst components are charged separately to a polymerization reactor.

7. The method of claim 5 wherein the monomer is butadiene-1,3.

8. The method of claim 5 wherein the monomer is a 1,4,9-decatriene.

9. The method of claim 5 wherein the monomer is isoprene.

10. The method of claim 5 wherein the monomer is allene.

11. The method of claim 5 wherein the monomer is dicyclopentadiene.

* * * * *